United States Patent [19]

Glazer et al.

[11] Patent Number: 4,590,554
[45] Date of Patent: May 20, 1986

[54] BACKUP FAULT TOLERANT COMPUTER SYSTEM

[75] Inventors: Sam D. Glazer, New York; James Baumbach, Brooklyn; Anita Borg, New York, all of N.Y.; Emanuel Wittels, Englewood Cliffs, N.J.

[73] Assignee: Parallel Computers Systems, Inc., Fort Lee, N.J.

[21] Appl. No.: 443,937

[22] Filed: Nov. 23, 1982

[51] Int. Cl.⁴ ............................................. G06F 15/16
[52] U.S. Cl. ...................................... 364/200; 371/7; 371/11
[58] Field of Search .................................. 371/9, 7, 11; 364/200 MS File, 900 MS File

[56] References Cited

U.S. PATENT DOCUMENTS

| | | | |
|---|---|---|---|
| 3,735,360 | 5/1973 | Anderson | 364/200 |
| 4,133,027 | 1/1979 | Hogan | 371/9 |
| 4,228,496 | 10/1980 | Katzman | 364/200 |
| 4,333,144 | 6/1982 | Whiteside | 364/200 |
| 4,347,563 | 8/1982 | Paredes | 371/9 |
| 4,351,023 | 9/1982 | Richer | 371/9 |
| 4,356,546 | 10/1982 | Whiteside | 364/200 |

FOREIGN PATENT DOCUMENTS 2032149  4/1980  United Kingdom ............... 371/9

Primary Examiner—James D. Thomas
Assistant Examiner—Florin Munteanu
Attorney, Agent, or Firm—Roberts, Spiecens & Cohen

[57] ABSTRACT

A parallel computer system which has a primary task processor, a second primary task processor, a secondary task processor acting as a backup for the second primary task processor transfers messages by:

sending messages from the primary task processor to the second primary processor with the second primary task processor operating on the messages by initially storing a received message in a queue and thereafter reading the message from the queue for processing in accordance with the task associated therewith and accumulating a count of the messages read from its queue; and sending the same messages from the first primary task processor to the secondary task processor which stores the messages in a message queue for possible use if the second primary task processor fails. If a primary task processor fails after processing a given number of messages, the secondary task processor associated therewith starts processing the messages in its queue but after having discarded the first given number of messages.

12 Claims, 2 Drawing Figures

BACKUP FAULT TOLERANT COMPUTER SYSTEM

This invention pertains to multiprocessor fault tolerant computer systems.

All fault tolerant computer systems require the duplication of both hardware and software resources. These systems differ in the way that the duplicate resources are used to provide fault tolerance and in the amount of additional computing power gained from the additional hardware. Such systems are similar in that they require that every primary process or task (executing program) has a backup process or task in a backup means capable of continuing execution if the primary task fails.

One such approach (e.g., STRATUS systems) requires that a process or task and its backup execute simultaneously on two CPUs (central processing unit) so that if one fails the other continues without interruption. One of the CPUs is generally called a "primary" and the second is generally called a "secondary" or "backup". The primary and backup are essentially indistinguishable. While such a system provides for fault tolerance, it should be noted that the duplicate hardware provides no increased computational capability.

A second approach involves keeping an inactive (nonexecuting) backup process which, in the case of failure of the primary CPU can be brought up on another backup or secondary CPU. In such case, the backup task must be kept in such a way that at any time it can take over from its primary task. In other words, the state of the backup task as represented by the universe or collection of values in its data space, must be either equal or identical to that of the primary task or be capable of becoming identical. In such systems, as long as failure does not occur, the duplicate hardware in the backup CPU can be used to run additional primary processes.

Such a system is shown in U.S. Pat. No. 4,228,496, later implemented by the assignee in the Tandem series of computer systems. In such a system, whenever the primary task receives a message, the primary task will now perform a computation based on the newly received message and produce new data which is stored in its date space resulting in a change thereof. When this data space changes, a checkpointing operation may be performed wherein the data space associated with the primary task is made available as the data space of the secondary or backup task. Thus, when a failure occurs in the primary, the backup task will continue to operate with the current data and information that was provided by the checkpointing of the primary task. Although in this type of a system the backup task is inactive so that the extra hardware can be used for other purposes, the frequent copying of the primary's data space into the secondary's data space often used a large portion of the added computing power.

BRIEF SUMMARY OF THE INVENTION

It is a general object of the invention to provide for fault tolerance while at the same time increasing the efficiency of the overall operation during normal processing by reducing the frequency of the large transfers of data and information required during checkpointing.

To accomplish this object, the invention contemplates that instead of keeping the backup or secondary task exactly up to date, the backup is kept nearly up to date but is provided with all information necessary to bring itself up to the state of the primary task should there by a failure of the primary task. The inventive concept is based on the notion that if two tasks start out in identical states and are given identical input information, they will perform identically.

In particular, all inputs to a process running on a system according to the invention are provided via messages. Therefore, all messages sent to the primary task must be made available to the secondary or backup task so that upon failure of the primary task the secondary task catches up by recomputing based on the messages. In essence, then, this is accomplished by allowing every backup task to "listen in on" its primary's message.

According to further features of the invention which avoid the complete recomputation by the backup task upon failure, a primary task and its backup task are periodically "synchronized" by a copy of the primary task's data space. While this synchronizing includes the checkpointing described above, it occurs less frequently. In the intervening periods, when the backup task is not identical to the primary, all messages to the primary task are kept available for the backup task. If the primary task then fails, the backup executes from the point of last synchronization using the saved input.

It should be apparent that such a routine makes normal computation much more efficient at the expense of a small amount of additional computation should a failure actually occur.

In addition, the method according to the invention requires fewer message transfers than the heretofore known checkpointing methods. There immediately also follows the fact that less computation time is required and less memory space needed as compared to conventional checkpointing.

More specifically, the invention contemplates a parallel computer system having at least a first and a second primary task performing means and a first and a second secondary (backup) task performing means. The task performing means are interconnected by a message bus means. In such a system, there is contemplated the method of sending messages among the task performing means. In particular, the invention contemplates sending messages from the first primary task performing means to the second primary task performing means which operates on the messages in accordance with the task associated with such means. The second primary task performing means operates on the received messages by initially storing a received message in a queue and thereafter reading the message from the queue for processing. In addition, this second primary task performing means accumulates a count of the messages it reads from the queue. At the same time, or immediately thereafter, the primary task performing means sends the same messages to the second secondary task performing means which stores these messages in a message queue associated therewith. The messages stored in the queue of the second secondary task performing means are only processed if there is a failure of the second primary task performing means.

BRIEF DESCRIPTION OF THE DRAWINGS

Other objects, the features and advantages of the invention will be apparent from the following detailed description when read in connection with the accompanying drawings which show, by way of example and not limitation, the apparatus for performing the invention.

IN THE DRAWINGS

Figure 1:
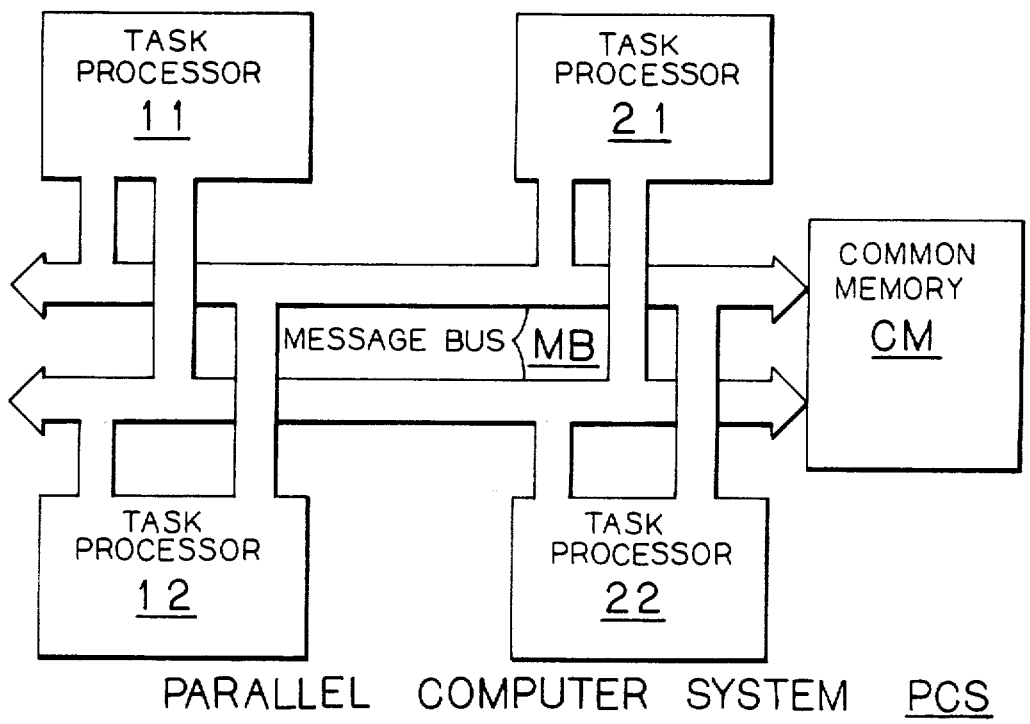
Figure 2:
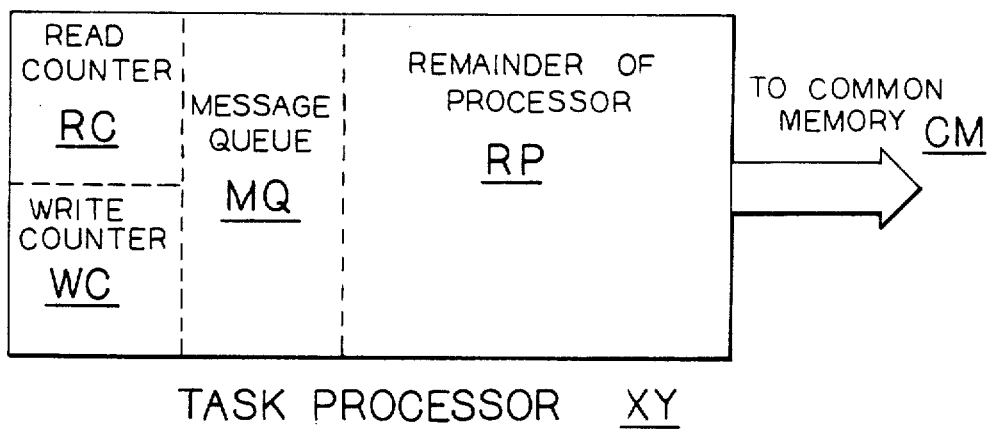

FIG. 1 is a block diagram of a parallel computer system utilizing the invention; and FIG. 2 is a generalized block diagram of one of the task processes in FIG. 1.

DETAILED DESCRIPTION OF THE PREFERRED EMBODIMENTS OF THE INVENTION

In FIG. 1 the parallel computer system PCS is shown including the primary task processor 11 with its associated backup or secondary task processor 12 and the second primary task processor 21 with its associated backup task processor 22 [A task processor can be a central processing unit (CPU), a program stored in a read only memory (ROM), and the state information stored in a random access memory (RAM) for performing a given process or task at a given time. The required hardware elements can be from the Motorola 68000 series]. These task processors are interconnected by means of the message bus MB which is preferably a dual message bus having complete redundancy. Furthermore, all task processors and particularly for the present application, the task processor 21 and its backup task processor 22 are shown connected via the message bus MB to a common memory CM (a common memory can be a pair of disc controllers connected to the pair of channels of the bus and rotating disc with sets of addressed registers on the disc being accessible to both processors of a pair). Although only two processor pairs, with one of the pairs being interconnected to a common memory are shown, it should be realized that innumerable processor pairs can be connected to the message bus MB. In an embodiment of the invention under construction, there are thirty-two such task processor pairs in the system. In the PCS messages can be transmitted from any task processor to any other task processor on the bus. In fact, the messages are transmitted from one task processor to other task processors in parallel over the two separate channels of the bus. In accordance with the invention, the messages are in general sent to three task processors, i.e., the originating task processor sends the message to the desired destination task processor as well as the backup task processor of the desired destination processor. Furthermore, this message is also preferably sent to the backup task processor of the originating task processor.

In FIG. 2, there is shown a generalized task processor XY. For the present description of the invention, the task processor XY can be considered to include a read counter RC, a write counter WC, a message queue MQ, and the remainder of the processor RP.

If the task processor is a primary processor, then the read counter RC is used and the write counter WC is ignored. If the task processor is a backup processor, then the write counter is used and the read counter is not used.

The read counter RC is used to accumulate a count of the number of messages read from the message queue MQ into the remainder of the processor RP. At the start of operations, this register is initialized and thereafter unit-incremented for each message read from the queue to the remainder of the processor. Whenever there is a synchronization between the primary processor and its associated backup processor, the read counter is initialized. As will hereinafter become apparent, synchronization is similar to checkpointing in that the primary processor and the backup processor are brought to the same state and, most particularly, that data spaces are identical.

The message that is transmitted by the originating processor is used in different ways by each of the receiving processors. The destination processor accepts the message and loads it into a queue for reading by the remainder of the processor. The message is also loaded into the queue of the backup processor of the receiving destination processor but is only for use by the remainder of the backup processor if there is a failure in the destination processor. Finally, the message is used in the backup processor of the sending processor merely to accumulate a count of the messages sent by the sending processor. The message is thereafter discarded (note that it is also possible for the backup processor of the destination processor to store a count of the messages transmitted by the originating processor for later use as will become apparent below).

There will now be described the fundamental operations of the system concerning the invention. Several assumptions will be made: first of all, it will be assumed that task processors 11 and 21 are primary task processors and task processors 12 and 22 are the respective backup task processors. Accordingly, task processors 11 and 21 do not need or utilize the write counter WC. Similarly, task processors 12 and 22 do not need nor utilize the read counter RC.

Before describing the fundamental operations, it will be useful to review the process of transmitting messages. A message in general includes a header, a body and an end-of-message indicator. Within the header there is at least the destination address of the message and the sending address of the message (it is preferably to incorporate in the header all three destination addresses, the addresses being based on position within the header). The conventional, well-known message interchange is for the sending unit to send a request to send the message to the destination unit. If the destination unit can receive the message it so tells the sending unit which then transmits the message. When the destination unit receives the message, it returns an acknowledgement message to the sending unit. Such a routine is well known in the art. For the present invention, it is only necessary to know that the sending processor "calls"-(sends a request to send message) to all three processors. Only when all three processors (or in the case when the sending processor's backup is not used to count transmitted messages then only the two other processors are "listening", that is to say, indicate they can receive the message) will the sending processor transmit the message. Only when all processors have received the message and so acknowledged is the message transmission considered complete.

The following Table I shows the state of the pertinent element of the system prior to operation. As can be seen, the write counters WC of the task processors 12 and 22 (the backup processors) are initialized to a zero value. The read counters RC in the task processors 11 and 21 (the primary processors) are also initialized to zero. In addition, the message queues of all processors are empty.

TABLE I

| TASK PROCESSOR | WRITE COUNTER | READ COUNTER | MESSAGE QUEUE |
|---|---|---|---|
| 11 | unused | 0 | 0 |
| 12 | 0 | unused | 0 |

TABLE I-continued

| TASK PROCESSOR | WRITE COUNTER | READ COUNTER | MESSAGE QUEUE |
| --- | --- | --- | --- |
| 21 | unused | 0 | 0 |
| 22 | 0 | unused | 0 |

Assume that the task processor 11, a sending or originating primary task processor emits three messages onto the message bus MB. The messages are primarily destined for the receiving or destination primary task processor 21. As will be recalled above, these messages also are sent to the task processor 22, the secondary task processor for the destination task processor 21, and the task processor 12 (the secondary task processor for the sending task processor 11). After the three messages are sent, Table II shows the status of the relevant elements of the system. In particular, the write counter WC of the backup task processor 12 for the sending task processor 11 stores a count of three indicating that the sending task processor has sent three messages. The message queues of the destination task processors (primary and secondary) 21 and 22 each store the three messages as represented by the symbols M1, M2 and M3. Task processor 21 will use these messages for processing. Task processor 22 will hold these messages and only use them if there is a breakdown in task processor 21. Task processor 12 merely stores a count indicating that three messages have been transmitted by its primary task processor 11.

TABLE II

| TASK PROCESSOR | WRITE COUNTER | READ COUNTER | MESSAGE QUEUE |
| --- | --- | --- | --- |
| 11 | unused | 0 | 0 |
| 12 | 3 | unused | 0 |
| 21 | unused | 0 | M1, M2, M3 |
| 22 | 0 | unused | M1, M2, M3 |

The next step in the operation is that the destination task processor 21 reads the messages M1 and M2 from its message queue and processes these messages. Table III shows the results of this operation. It should be noted that the difference now is that the message queue for task processor 21 shows merely the storage of the message M3 while its read counter stores a count of two indicating that two messages (M1 and M2) have been read from the message queue.

TABLE III

| TASK PROCESSOR | WRITE COUNTER | READ COUNTER | MESSAGE QUEUE |
| --- | --- | --- | --- |
| 11 | unused | 0 | 0 |
| 12 | 3 | unused | 0 |
| 21 | unused | 2 | M3 |
| 22 | 0 | unused | M1, M2, M3 |

Assume in response thereto that the task processor 21 generates two messages M4 and M5 which it transmits to the task processor 11, now acting as a destination primary task processor. As can be seen from the following Table IV, the message queues for the task processors 11 and 12 each store the messages M4 and M5. In addition, the write counter of the task processor 22 accumulates a count of two.

TABLE IV

| TASK PROCESSOR | WRITE COUNTER | READ COUNTER | MESSAGE QUEUE |
| --- | --- | --- | --- |
| 11 | unused | 0 | M4, M5 |
| 12 | 3 | unused | M4, M5 |
| 21 | unused | 2 | M3 |
| 22 | 2 | unused | M1, M2, M3 |

During normal operation, a primary processor and its backup processor are synchronized whenever the queue of the saved messages in the backup processor becomes too large. At that time, the backup processor sends a special message to the primary processor requesting synchronization. In response thereto, the primary processor writes all the pages of its data space into a common memory shared with the backup processor. In addition, the primary processor sends the counter number of the number of messages it has read from its queue, either from the start of operation or thereafter from the previous synchronization, to the backup processor. The backup processor uses this count value to discard the corresponding number of messages from the start of its queue. In this way, should the backup processor start operating because of failure of the primary processor, it will only process messages that had not been processed since the previous synchronization. After sending the read count to the backup processor, the primary processor initializes its stored read count. In addition, the write counter in the backup processor is zeroed. It will be assumed that synchronization is called for and the following Table V shows the state of the pertinent elements after such synchronization.

TABLE V

| TASK PROCESSOR | WRITE COUNTER | READ COUNTER | MESSAGE QUEUE |
| --- | --- | --- | --- |
| 11 | unused | 0 | M4, M5 |
| 12 | 3 | unused | M4, M5 |
| 21 | unused | 0 | M3 |
| 22 | 0 | unused | M3 |

Note that the memory queues of the task processors 21 and 22 are identical and that the read counter of the task processor 21 shows a zero. What is not shown in the table is that the common memory CM2 stores the up-to-date data space of the task processor 21 which is now accessible to the task processor 22.

There will now be described the takeover of the processing by the backup task processor 22 because of the failure of the primary task processor 21. What should be realized is that the processor 22 will start processing at the point where the last synchronizing took place, or if the operation was just starting without any synchronizations, from the start of operations. It should be realized that either case is the same. To simplify the discussion, it will be assumed that there has been no synchronization and that the system is in the state represented by Table IV. At a failure, the backup processor takes over. It is preferable at the time of taking over that it spawn a new backup task processor; however, since this spawning does not form part of the present invention, that operation will not be discussed. However, the backup task processor starts processing the data. The important point is that in the processing, the backup processor 22, now acting as the primary processor, does not retransmit any messages that the now-failed primary processor 21 had emitted before failure. This is accomplished by means of of the count in the write counter of the processor 22. It will be noted that this, for the example given, contains a count of two indicating that the processor 21 before failing and from the time of starting or from the time of the last synchronization had emitted two messages. Therefore, the task processor 22 in the course of processing, when it reaches the first time to emit a message will not emit that message but decrement the write counter to a count of one. Thereafter, when the next message is to be emitted, again the message will be suppressed and the count decremented to zero. At that point, all messages previously emitted by processor 21 have been suppressed and all messages now generated by the processor 22 will be transmitted. Table VI shows the state at the time of failure.

TABLE VI

| TASK PROCESSOR | WRITE COUNTER | READ COUNTER | MESSAGE QUEUE |
| --- | --- | --- | --- |
| 11 | unused | 0 | M4, M5 |
| 12 | 3 | unused | M4, M5 |
| 21 | unused | failed | failed |
| 22 | 2 | unused | M1, M2, M3 |

There has thus been described the fundamental operations associated with the fault tolerant processing of messages. Although the fundamental operations have been given above in a particular order, it should be realized that they could occur in any order and could be among the various processors not specifically those cited in the example.

What is claimed is:

1. In a parallel computer system having first and second primary task performing means and one secondary task performing means acting as a backup for said second primary task performing means, the method of transferring messages among said task performing means each message including a header, a body and an end of message indicator, said method comprising the steps of:
    sending messages from said first primary task performing means simultaneously to said second primary task performing means and said one secondary task performing means;
    said second primary task performing means operating on said messages by initially storing a received message in a queue and thereafter reading the message from the queue; and
    said one secondary task performing means only storing said messages in a message queue unless instructed to process at least some of said messages as a result of the failure of operation on at least one of said messages by said second primary task performing means.

2. The method of claim 1 further comprising the step of counting the messages sent by said first primary task performing means.

3. The method of claim 1 further comprising the step of said first primary task performing means simultaneously transmitting a message to said second primary task performing means and said one secondary task performing means only after both said second primary task performing means and said one secondary task performing means indicate to said first primary task performing means that they can receive the message.

4. The method of claim 3 further comprising the step of both said second primary task performing means and said one secondary task performing means indicating to said primary task performing means that they have received the message.

5. In a parallel computer system having at least a first primary task performing means, a first secondary task performing means acting as a backup for said first primary task performing means, a second primary task performing means, a second secondary task performing means acting as a backup for said second primary task performing means, each of said task performing means having a task performing memory means, and a message bus means interconnecting said task performing means, the method of transferring messages among said task performing means, comprising the steps of:
    simultaneously sending on said message bus means a plurality of messages to said second primary task peforming means and to said first and second secondary task performing means, each of said messages including a header, a body and an end of message indicator;
    said second primary task performing means operating on said plurality of messages received from said first primary task performing means by initially storing said messages in a queue in its associated task performing memory means and thereafter sequentially reading said messages from said queue for processing in accordance with the task associated with said second primary task performing means;
    said second secondary task performing means only storing said plurality of messages received from said first primary task performing means in a corresponding queue of its associated task performing memory means unless instructed to process at least some of said messages as a result of the failure of the operation on at least one of said messages by said second primary task performing means; and said first secondary task performing means at least counting the number of messages of the plurality of messages received from said first primary task performing means.

6. The method of claim 5 wherein said second primary and secondary task performing means have access to a common memory means and further comprising the steps of said second primary task performing means transmitting a set p of messages to another primary task performing means and to a secondary task performing means associated with said other primary task performing means as well as to said second secondary task performing means, said second secondary task performing means at least accumulating a count of said p messages received from said second primary task performing means, after sending said p messages said second primary task performing means becomming inoperative, said secondary task performing means beginning processing the messages in its queue only sending messages after a set of p messages base has been and generated from the start of its taking over processing.

7. The method of claim 5 further comprising the step of said second primary task performing means accumulating a count n of the number of messages sequentially read from its queue for processing.

8. The method of claim 7 further comprising the step of said first primary task performing means transmitting a message only after all three other task performing means indicate to said first primary task performing means that they can receive the message.

9. The method of claim 8 further comprising the step of all three other task performing means indicating that they have received the message.

10. The method of claim 7 wherein said second primary task performing means and said second secondary task performing means have access to a common memory means, and whenever the messages in the queue of said second secondary task performing means exceeds a predetermined amount said second primary task performing means transferring the contents of its task performing memory means to said common memory means, transferring the accumulated count n of the messages read from its queue to said second secondary task performing means, and zeroing said accumulated count as stored in said second primary task performing means.

11. The method of claim 10 wherein said second primary and second secondary task performing means share a common memory means further comprising the steps of thereafter said second primary task performing means becoming inoperative, said second secondary task performing means beginning processing the messages in its message queue utilizing the data stored in said common memory means but after discarding the first n messages therein, n being the accumulated count number received from said second primary task performing means when the transfer of the contents of the task performing memory means of said second primary task performing means to said common memory means occurred.

12. The method of claim 7 wherein said second primary task performing means and said second secondary task performing means having access to a common memory means, and whenever the messages in the queue of said second secondary task performing means exceed a predetermined amount said second primary task performing means transferring the contents of its task performing memory means to said common memory means and transferring the accumulated count n of the read messages to said second secondary task performing means, said second task performing means discarding the first n messages stored in its message queue, said second primary task performing means thereafter sending p messages to another task performing means, said second secondary task performing means accumulating a count of the p messages sent by said second primary task performing means, after sending said p messages said second primary task performing means becoming inoperative, said second secondary task performing means beginning processing the messages in its message queue utilizing the data stored in said common memory means but not sending the first p messages generated from the start of its taking over processing.

* * * * *